United States Patent [19]

Iso et al.

[11] Patent Number: 4,539,665
[45] Date of Patent: Sep. 3, 1985

[54] TRACKING SERVO CONTROL UNIT FOR AN INFORMATION REPRODUCING APPARATUS

[75] Inventors: Yoshimi Iso, Yokohama; Shigeki Inoue, Toyokawa; Tsutomu Noda, Yokohama; Shinichi Ohashi, Chigasaki, all of Japan

[73] Assignee: Hitachi, Ltd., Tokyo, Japan

[21] Appl. No.: 468,190

[22] Filed: Feb. 22, 1983

[30] Foreign Application Priority Data

Feb. 22, 1982 [JP] Japan ................................. 57-26004

[51] Int. Cl.³ .......................... G11B 7/00; G11B 21/10
[52] U.S. Cl. ........................................ 369/44; 369/46; 369/33; 369/32
[58] Field of Search .................. 369/44, 46, 32, 33, 369/41; 250/202; 358/342

[56] References Cited

U.S. PATENT DOCUMENTS

| | | | |
|---|---|---|---|
| 4,037,252 | 7/1977 | Janssen | 250/202 |
| 4,057,832 | 11/1977 | Kappert | 369/44 |
| 4,338,682 | 7/1982 | Hosaka et al. | 369/44 |
| 4,340,950 | 7/1982 | Kosaka | 369/44 |
| 4,359,635 | 11/1982 | Gross | 369/44 X |
| 4,365,324 | 12/1982 | Michaelis | 250/202 |

Primary Examiner—Raymond F. Cardillo, Jr.
Assistant Examiner—Alan K. Aldous
Attorney, Agent, or Firm—Antonelli, Terry & Wands

[57] ABSTRACT

An information reproducing apparatus having a tracking servo control loop for causing an information reading unit including device for detecting a tracking error signal for tracking an information bearing track on a disc, to track the information bearing track in accordance with the tracking error signal so as to reproduce information in accordance with an information signal read by the information reading unit. A circuit for extracting a discrimination signal for discriminating a negative feedback region of the tracking error signal is provided so that a tracking servo control loop is closed in the negative feedback region.

7 Claims, 9 Drawing Figures

TRACKING SERVO CONTROL UNIT FOR AN INFORMATION REPRODUCING APPARATUS

The present invention relates to a tracking servo control unit for an information reproducing apparatus such as a DAD player or a video disc player.

Information recorded on a digital audio disc (DAD) is read out by optical read means by directing a light to a signal track consisting of disc pits and demodulating a reflected light or a transmitted light from a record surface which is modulated by the presence or absence of the pits. In such a read device for the information record disc, a tracking servo control unit is provided to detect a tracking error signal representing a deviation of a projected light from a center of a signal track in order to move the projected light to the center of the signal track of the disc so that the projected light exactly tracks the signal track of the disc. While many methods for detecting the tracking error signal are known, a tracking servo control unit which utilizes what is called three-spot pickup system is explained here.

FIG. 1 shows a circuit diagram of a prior art tracking servo control unit, together with a partial enlarged view of a track of a disc and waveforms. The disc has a spiral signal track a and an area b between the tracks. In the three-spot pickup system, three spots A, B and C are used to track the signal track a in order to read out a signal. The spots A, B and C are moved in union. The spot A is a reading spot for the signal track while the spots B and C are tracking error detecting spots. The spots B and C are displaced from a center of the reading spot by approximately one half of a width of the track oppositely to each other as viewed in the direction of the width of the track, and centers of the spots B and C are displaced from the center of the spot A as viewed in the longitudinal direction of the track. When the reading spot A is located at the center of the track a, the outputs from the spots B and C are of the same magnitude, and when the spot A deviates from the center of the track a to be read, the outputs from the spots B and C are different. A difference between the outputs from the spots B and C is proportional to a displacement of the spot A from the center of the track a. The reading spot A is moved to the center of the track a to be read by a tracking error signal devived from the difference between the outputs from the spots B and C. Those three spots A, B and C are formed on the disc through an object lens not shown. Thus, as the spot A is displaced, the spots B and C are also displaced by the same distance in the same direction. Namely, those three spots A, B and C are moved in union.

The signal track a on the disc is spirally formed. If a center hole of the disc is eccentric and the center of the spiral of the signal track a and the center of rotation of the disc do not coincide, several tracks pass though the reading spot A when the tracking servo loop is disconnected to fix the reading spot A.

A waveform $S_1$ shown in FIG. 1 represents an output waveform of a photoelectric converter 1 which photoelectrically converts an output signal from the reading spot A when the track a pass through the reading spot A, and a waveform $S_2$ represents a tracking error signal derived by photoelectrically converting the outputs from the tracking error detecting spots B and C by photoelectric converters 6 and 7, respectively, and producing a difference (B-C) by a differential amplifier 8. In the waveform $S_1$, a level 0 represents a so-called virtual dark level in which the output from the spot A is zero because of the absence of a reflected light from the disc, a level M represents a so-called mirror surface level in which the reflected light is maximum, and R represents an envelope of variation of a pit level as the track traverses the reading spot A.

The tracking error signal $S_2$ is now explained. As described above, the outputs from the spots B and C are equal when the spot A is located at the center of the track a. Accordingly, the tracking error signal $S_2$ derived from the differential amplifier 8 is zero. However, if the spots A, B and C are relatively displaced to the right on the signal track a, the output from the spot B increases while the output from the spot C decreases and the difference between them which is derived from the differential amplifier 8 increases positively and the magnitude of the positive output voltage further increases as the rightward displacement further increase. However, when the spot B faces the right adjacent track a the output from the spot B decreases and the positive output voltage decreases. When the spot A is moved to the center of the right adjacent intertrack area b, the tracking error signal is zero. On the other hand, when the spots A, B and C are relatively displaced leftward, the output from the spot B decreases while the output from the spot C increases and the difference between them is amplified by the differential amplifier 8, which produces a negative output voltage. The negative output voltage further increases as the spots are further displaced leftward. When the spot C faces the left adjacent track a, the output from the spot C decreases and the negative output voltage decreases. When the spot A is displaced to the center of the left adjacent intertrack area b, the tracking error signal is zero. Accordingly, the waveform $S_2$ is produced as the spot A deviates from the center of the track a.

When a switch 11 is in a closed position, the tracking error signal $S_2$ is supplied to a tracking coil 14 of an actuator, not shown, through a phase compensation circuit 12, an amplifier 13 and driver transistors 15 and 16. Thus, a current corresponding to the positive or negative voltage generated when the spot A is deviated from the center of the track a flows through the coil 14, which drives the actuator to move an object lens supported by the actuator in the widthwise direction of the track so that the spot A is brought to the center of the track a. When the tracking error signal $S_2$ is a positive voltage, the actuator is moved to the left, and when it is a negative voltage, the actuator is moved to the right to bring the spot A to the center of the track a.

The switch 11 is opened during an access period in which the actuator having the tracking coil 14 is radially moved to a predetermined position at a high speed. When the switch 11 is in an open position, the tracking servo control loop from the spots A, B and C to the coil 14 is opened to facilitate the random access operation. In a normal signal read mode, the switch 11 is closed to close the tracking servo control loop so that the tracking servo operation is carried out.

FIG. 2 shows an enlarged view of the tracking error signal. A point J is the center of the track. When the servo loop is closed, the signal is a negative voltage in a region D-J and the actuator is driven rightward, and the signal is a positive voltage in a region J-L and the actuator is driven leftward so that the spot A is moved to the target track position J.

Assuming that the tracking servo loop is closed at a point H, the actuator is moved rightward by a negative voltage h, at the point H, and at a point I it is further moved rightward by a voltage i which is smaller than the voltage h, and it finally converges to the point J. Since the actuator is moved in the direction of decreasing voltage in the region G-K, if the servo loop is closed in this region, a negative feedback is applied and the servo loop stably converges.

In the regions D-G and K-L, the servo loop is of positive feedback because the actuator is moved in the direction of increasing voltage. If the servo loop is closed at a point E, the actuator is moved rightward by a voltage e, and at a point F, it is accelerated rightward by a voltage f which is larger than the voltage e, and at a point G which is an entry to the negative feedback region G-K, it is moved rightward with a maximum accleration. As a result, the actuator is moved past the track center point J toward the positive maximum voltage point K, and when the rightward acceleration disappears, it is then moved leftward. Thus, the actuator is alternately moved leftward and rightward toward the point J.

If the center of the disc is eccentric and the center of the spiral of the signal track and the center of rotation of the disc do not coincide, the positions of the points G, J, K, ... move to the left and right as the disc rotates. If the eccentricity of the disc is large, the positions of the points G, J, K, ... significantly vary. Further, if a gain of the tracking servo loop is high, a large positive or negative voltage is produced and the actuator is moved in a large amplitude. As a result, the actuator may oscillate before it is locked and in an extreme case the servo locking may not be attained.

It is an object of the present invention to provide a tracking servo control unit for an information reproducing apparatus which can stably and positively close a tracking servo control loop in a short period.

In order to achieve the above object, the tracking servo control unit of the present invention detects a discrimination signal which discriminates a negative feedback region in a so-called S curve of a tracking error signal so that a tracking servo control loop is closed in the negative feedback region of the tracking error signal to stably and positively attain pull-in in a short period. The present invention also detects the negative feedback region without any adjustment for a variation of a reflection factor of a disc.

Figure 1:
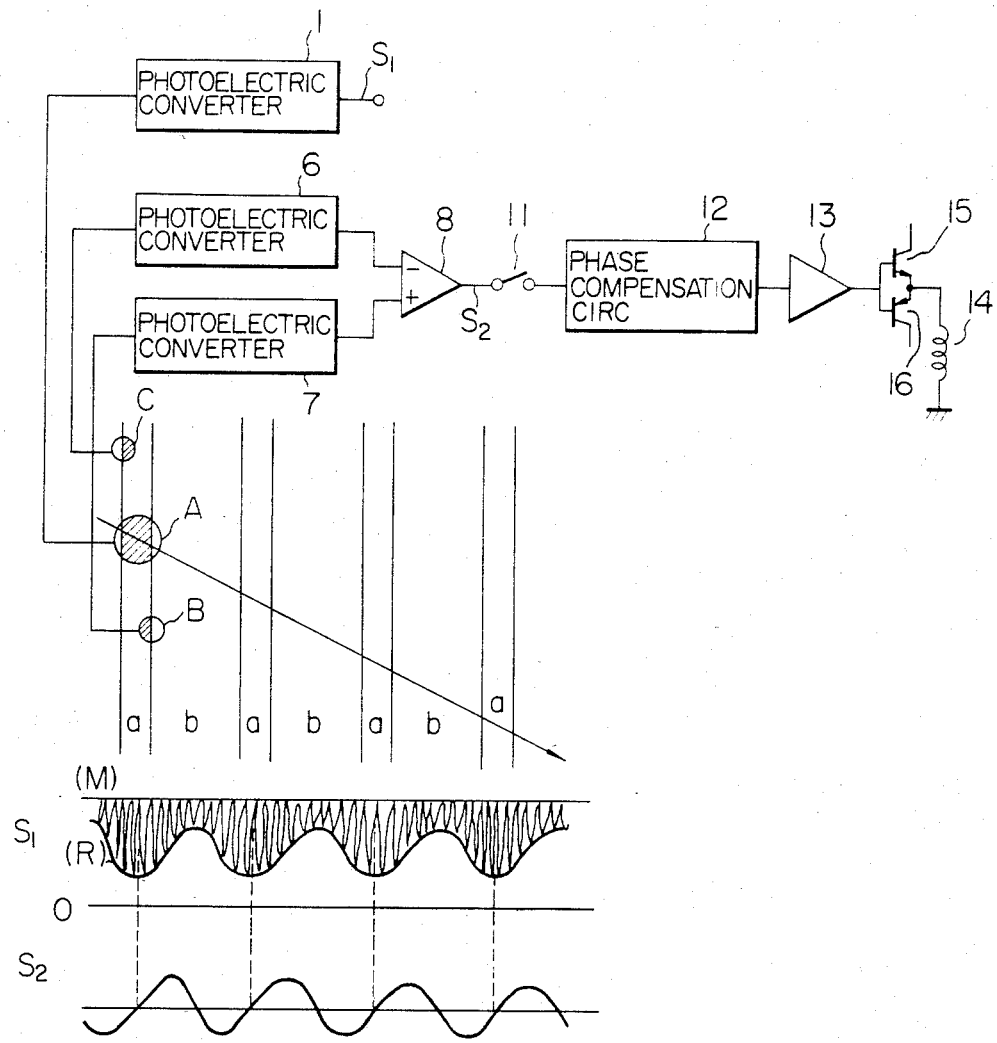
FIG. 1 shows a circuit diagram of a prior art tracking servo control unit, together with a partial enlarged view of a track of a disc and waveforms.
Figure 2:
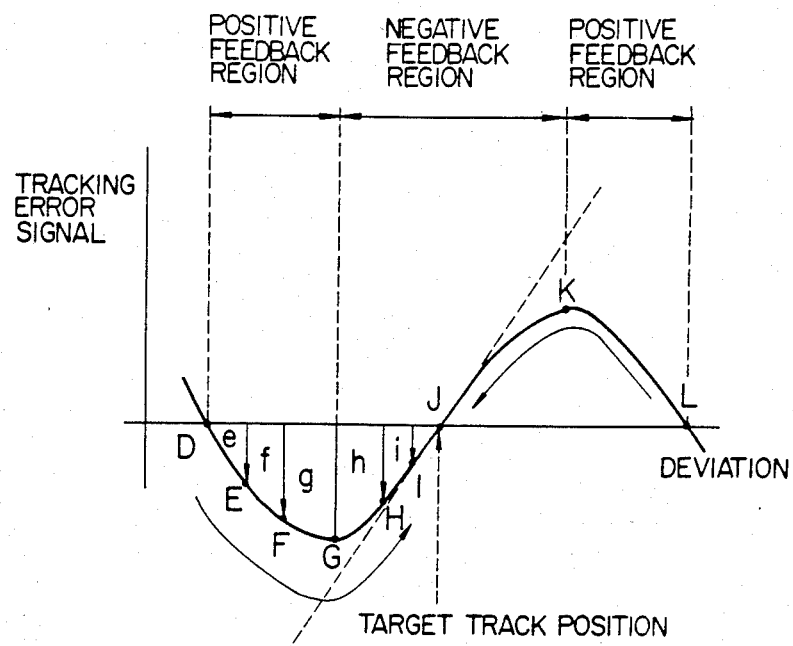
FIG. 2 shows a partial enlarged view of a tracking error signal.
Figure 3A:
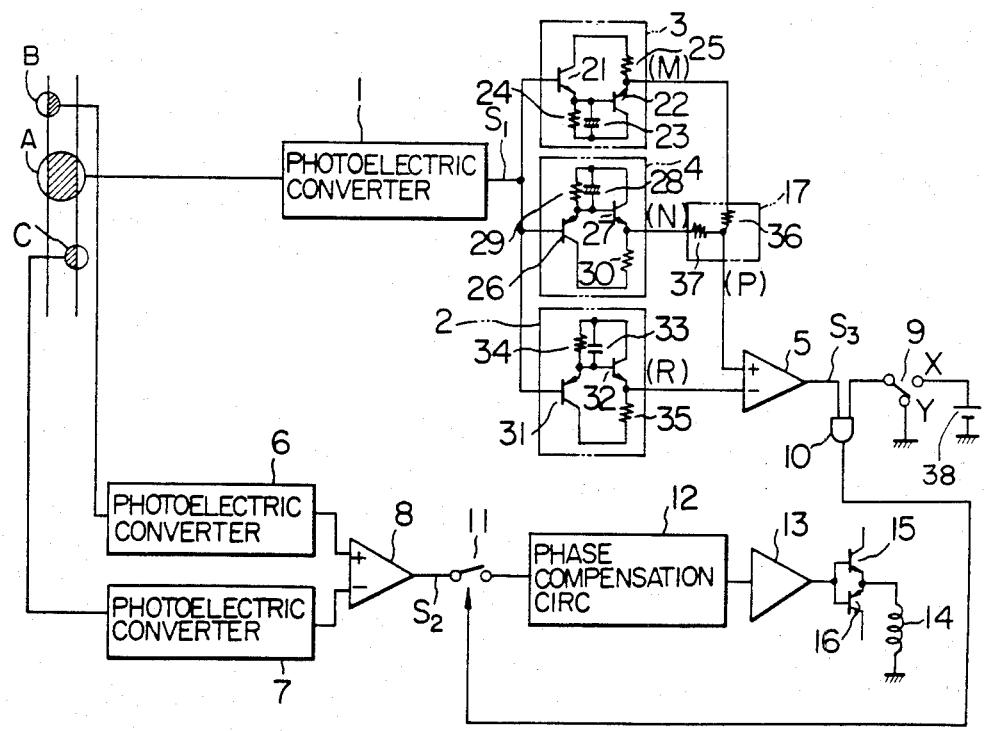
FIGS. 3A and 3B show a circuit diagram of one embodiment of the present invention and waveforms.
Figure 3B:
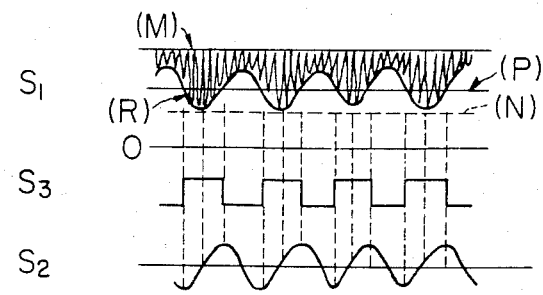
Figure 4:
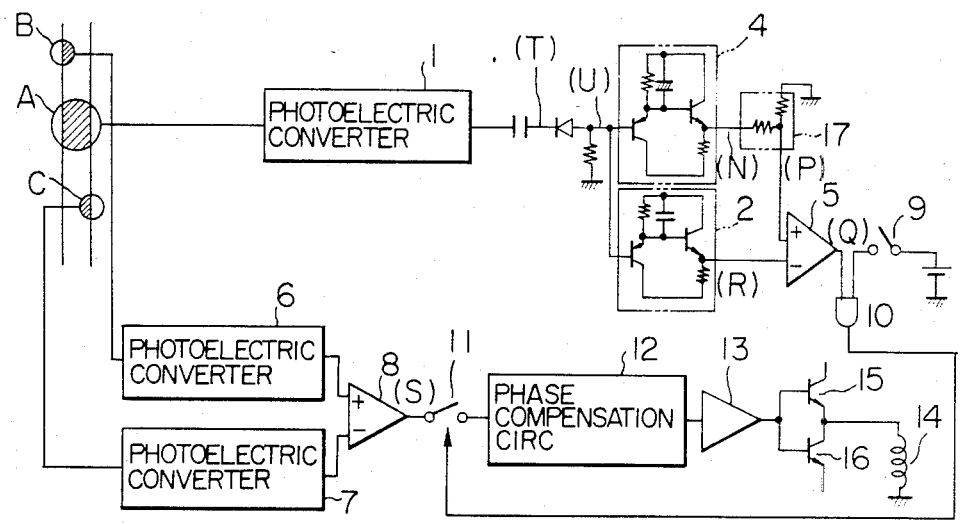
FIGS. 4 and 5A to 5D show a circuit diagram of another embodiment of the present invention and waveforms.
Figure 5A:
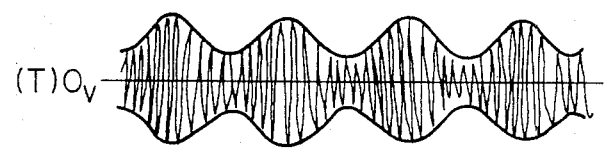
Figure 5B:
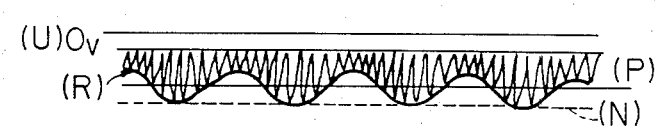
Figure 5C:
Figure 5D:

FIGS. 3A and 3B show one embodiment of the present invention. In FIG. 3A, A denotes a reading spot to a track, B and C denote tracking error signal detecting spots, numerals 1, 6 and 7 denote photoelectric converters, numerals 2, 3 and 4 denote peak level detectors, numeral 3 denotes a mirror surface level detector, numeral 4 denotes a pit surface level detector, numeral 2 denotes a signal envelope detector, numeral 17 denotes an adder, numeral 5 denotes a comparator, numeral 10 denotes an AND circuit, numeral 9 denotes a tracking servo loop on-off control switch, numeral 11 denotes a switch which is closed when an output of the AND circuit 10 is high, numeral 8 denotes a differential amplifier, numeral 12 denotes a phase compensation circuit, numeral 13 denotes an amplifier, numeral 14 denotes a tracking coil of an actuator and numerals 15 and 16 denote driver transistors.

An operation of the mirror surface level detector 3 is first explained. A signal shown by a waveform $S_1$ of FIG. 3B is applied to the base of a transistor 21 and a maximum voltage is instantly charged in a capacitor 23 connected to the emitter of the transistor 21 through a low impedance path. The voltage is slowly discharged through a high impedance resistor 24 connected in parallel to the capacitor 23. Thus, the peak voltage applied to the base of the transistor 21 is essentially held at the emitter. A transistor 22 compensates for a base-emitter voltage drop of the transistor 21. Thus, the peak voltage M applied to the base of the transistor 21 is produced at an output of the peak level detector 3. The pit surface level detector 4 detects a minimum level N shown by a broken line in the waveform $S_1$. The operation thereof is similar to that of the peak level detector 3. The signal envelope detector 2 is of the same circuit configuration as the pit surface level detector 4 but a capacitance of a capacitor 33 is smaller to detect an envelope R.

The outputs of the mirror surface level detector 3 and the pit surface level detector 4, that is, the levels M and N are added by an adder 17 comprising resistors 36 and 37 to produce a slicing level P, which is applied to a positive input terminal of the comparator 5. The output of the signal envelope detector 2, that is, the envelope R is applied to a negative input terminal of the comparator 5, which produces a high level output only when the level of the envelope R is lower than the slicing level P. Thus, a waveform $S_3$ is produced. The outputs from the tracking error detecting spots B and C are supplied to the differential amplifier 8 through the photoelectric converters 6 and 7 and the differential amplifier 8 produces the tracking error signal as shown by a waveform $S_2$ of FIG. 3B. Referring now to the waveforms $S_2$ and $S_3$, when the level of the waveform $S_3$ is high, it indicates that the actuator is in the vicinity of the signal position or the track position. In this manner the negative feedback region of the tracking error signal $S_2$ can be detected.

Thus, when it is desired to close the tracking servo control loop, the track servo switch 11 is turned on by using the waveform $S_3$ as a trigger. In this manner, the tracking servo control loop can be stably closed. A power supply 38, the switch 9 and the AND circuit 10 form a circuit which closes the track servo switch 11 when the waveform $S_3$ assumes the high level. During the access operation, the switch 9 is connected to a contact Y and the output of the AND circuit 10 is always low level and the switch 11 is kept in the off position. Accordingly, the tracking servo control loop is not closed. When the switch 9 is connected to a contact X after the termination of the access operation, the switch 11 is turned on only when the output of the waveform $S_3$ is high and the tracking servo control loop is closed.

In the present embodiment, the mirror surface level detector 3 and the pit level detector 4 produce the slicing level to be compared with the output of the signal envelope detector 2 in order to compensate for the variation of the levels M and N due to the variation of the disc. Thus, in accordance with the embodiment of FIG. 3A, the negative feedback region can always be detected stably between the levels M and N even if the disc is exchanged.

FIG. 4 and 5A to 5D show another embodiment of the present invention. In the embodiment shown in FIG. 3A, the output voltage of the photoelectric converter 1 is directly supplied to the level detector. In the present embodiment shown in FIG. 4, the output of the photoelectric converter 1 is supplied through a capacitor to extract only an A.C. voltage component waveform T and it is supplied to a half-wave rectifying circuit comprising a diode to extract only a negative portion of the waveform T, which is then supplied to the level detector. In the present embodiment, the mirror surface level detector 3 shown in FIG. 3A is not necessary and it can be substituted by ground level. The other operation is similar to that of FIG. 3A and the negative feedback region can be similarly detected and the tracking servo control loop is closed.

As described hereinabove, according to the present invention, since the negative feedback region of the tracking error signal is detected to close the tracking servo control loop, the tracking servo is always stably pulled in. Thus, even if the eccentricity of the disc is large or the loop gain is high, the oscillation or vibration of the actuator in the closed state of the tracking servo control loop is avoided and the tracking servo control loop is stably closed.

Further, since the slicing level for detecting the feedback region automatically follows the variation of the reflection factor of the disc and the variation of the excentricity of the disc, the tracking servo control loop can be stably pulled in even if the disc is exchanged.

What is claimed is:

1. In an information reproducing apparatus having tracking servo control loop for causing an information reading unit, including means for detecting a tracking error signal for tracking an information bearing track on a disc, to track said information bearing track in accordance with said tracking error signal to reproduce information in accordance with an information signal read by said information reading unit,
a tracking servo control unit for said information reproducing apparatus comprising;
voltage generation means for generating a voltage corresponding to said information signal read by said information reading unit;
reference voltage generating means;
a compare circuit for comparing the output of said voltage generation means with the output of said reference voltage generating means to produce a discrimination signal to discriminate a negative feedback region of said tracking error signal; and
control means responsive to said discrimination signal for closing said tracking servo control loop in said negative feedback region;
said reference voltage generating means generating a reference voltage based on said information signal read by said information reading unit, said reference voltage generating means including a first level detector for detecting a maximum level of said information signal, a second level detector for detecting a minimum level of said information signal, and an adder for adding the output of said first level detector and the output of said second level detector to produce said reference voltage representative of an intermediate level between the maximum level and the minimum level of an envelope of said information signal.

2. In an information reproducing apparatus having a tracking servo control loop for causing an information reading unit, including means for detecting a tracking error signal for tracking an information bearing track on a disc, to track said information bearing track in accordance with said tracking error signal to reproduce information in accordance with an information signal read by said information reading unit,
a tracking servo control unit for said information reproducing apparatus comprising:
voltage generation means for generating a voltage corresponding to said information signal read by said information reading unit;
reference voltage generating means;
a compare circuit for comparing the output of said voltage generation means with the output of said reference voltage generating means to produce a discrimination signal to discriminate a negative feedback region of said tracking error signal; and
control means responsive to said discrimination signal for closing said tracking servo control loop in said negative feedback region;
said voltage generation means being a signal envelope detector for detecting an envelope of said information signal read by said information reading unit, and said reference voltage generating means including a first level detector for detecting a maximum level of said information signal, a second level detector for detecting a minimum level of said information signal and an adder for adding the output of said first level detector and the output of said second level detector to produce a reference voltage representative of an intermediate level between the maximum level and the minimum level of the envelope of said information signal.

3. In an information reproducing apparatus having a tracking servo control loop for causing an information reading unit, including means for detecting a tracking error signal for tracking an information bearing track on a disc, to track said information bearing track in accordance with said tracking error signal to reproduce information in accordance with an information signal read by said information reading unit,
a tracking servo control unit for said information reproducing apparatus comprising;
voltage generation means for generating a voltage corresponding to said information signal read by said information reading unit;
reference voltage generating means;
a compare circuit for comparing the output of said voltage generation means with the output of said reference voltage generating means to produce a discrimination signal to discriminate a negative feedback region of said tracking error signal; and
control means responsive to said discrimination signal for closing said tracking servo control loop in said negative feedback region;
said voltage generation means being a signal envelope detector for detecting an envelope of said information signal read by said information reading unit, and said reference voltage generating means including a first level detector for detecting a maximum level of said information signal, a second level detector for detecting a minimum level of said information signal and an adder for adding the output of said first level detector and the output of said second level detector to produce a reference voltage representative of an intermediate level between the maximum level and the minimum level of the envelope of said information signal, and said comparing circuit compares the output of said adder with the output of said signal envelope detector to produce a control signal discriminating the negative feedback region of said tracking error signal, whereby said tracking servo control loop is closed in response to said control signal.

4. In an information reproducing apparatus having a tracking servo control loop for causing an information reading unit, including means for detecting a tracking error signal for tracking an information bearing track on a disc, to track said information bearing track in accordance with said tracking error signal to reproduce information in accordance with an information signal read by said information reading unit,
   a tracking servo control unit for said information reproducing apparatus comprising;
   voltage generation means for generating a voltage corresponding to said information signal read by said information reading unit;
   reference voltage generating means;
   a compare circuit for comparing the output of said voltage generation means with the output of said reference voltage generating means to produce a discrimination signal to discriminate a negative feedback region of said tracking error signal; and
   control means responsive to said discrimination signal for closing said tracking servo control loop in said negative feedback region;
   said tracking servo control unit further comprising an A.C. voltage generator for extracting an A.C. signal derived from said information signal read by said information reading unit, and said reference voltage generating means including a peak level detector for detecting a peak level of said A.C. signal and an adder for adding the output of said peak level detector and a substantially ground level voltage to produce the reference voltage representative of an intermediate level between the maximum level and the minimum level of the envelope of said information signal.

5. In an information reproducing apparatus having a tracking servo control loop for causing an information reading unit, including means for detecting a tracking error signal for tracking an information bearing track on a disc, to track said information bearing track in accordance with said tracking error signal to reproduce information in accordance with an information signal read by said information reading unit,
   a tracking servo control unit for said information reproducing apparatus comprising:
   voltage generation means for generating a voltage corresponding to said information signal read by said information reading unit;
   reference voltage generating means;
   a compare circuit for comparing the output of said voltage generation means with the output of said reference voltage generating means to produce a discrimination signal to discriminate a negative feedback region of said tracking error signal; and
   control means responsive to said discrimination signal for closing said tracking servo control loop in said negative feedback region;
   said tracking servo control unit further comprising an A.C. voltage generator for extracting a positive or negative portion of an A.C. signal from said information signal read by said information reading unit and a signal envelope detector for detecting an envelope of the output of said A.C. voltage generator, said reference voltage generating means including a peak value detector for detecting a peak level of said A.C. signal and an adder for adding the output of said peak level detector and a substantially ground level voltage to produce the reference voltage representative of an intermediate level between the maximum level and the minimum level of the envelope of said information signal, and said compare circuit comparing the output of said adder with the output of said signal envelope detector to produce a control signal discriminating the negative feedback region of said tracking error signal, whereby said tracking servo control loop is closed in response to said control signal.

6. In an information reproducing apparatus having a tracking servo control loop for causing an information reading unit, including means for detecting a tracking error signal for tracking an information bearing track on a disc, to track said information bearing track in accordance with said tracking error signal to reproduce information in accordance with an information signal read by said information reading unit,
   a tracking servo control unit for said information reproducing apparatus comprising;
   a voltage generation means for generating a voltage corresponding to said information signal read by said information reading unit;
   reference voltage generating means;
   compare circuit means for comparing the output of said voltage generation means with the output of said reference voltage generating means to produce a discrimination signal to discriminate a negative feedback region of said tracking error signal; and
   control means responsive to said discrimination signal for closing said tracking servo control loop in said negative feedback region;
   said tracking servo control unit further comprising an A.C. voltage generator for extracting an A.C. signal derived from said information signal read by said information unit, and said reference voltage generating means including means responsive to said A.C. signal for generating a reference voltage signal having a level between the maximum and minimum levels of one of the upper and lower envelopes of said A.C. signal.

7. A tracking servo control unit for an information reproducing apparatus according to claim 6, wherein said reference voltage generating means is constituted by at least a peak level detector for detecting a peak level of said A.C. signal and an adder for adding the output of said peak level detector and a substantially ground level voltage to produce the reference voltage signal representative of an intermediate level between the maximum level and the minimum level of the envelope of said information signal.

* * * * *